United States Patent Office 3,472,652
Patented Oct. 14, 1969

3,472,652
SEMICONDUCTING MATERIAL

Gasan Mamed Bagir Ogly Abdullaev, Ulitsa Uzeira Gadzhibekova 45, kv. 48; Rakhim Khasan Nani, Ulitsa 4 Khrebtovaya, 535 kvartal, blok 5, kv. 41; Yadulla Nusrat Ogly Nasirov, 3 Mikroraion 24, kv. 12; and Arif Zulfigarovich Kuliev, Tbilisskoe shosse 5-B-4, blok 4, kv. 55, all of Baku, U.S.S.R.; and Mikhail Grigorievich Epshtein, stantsia Pravda Severnoi zh. d. Lermontovskaya ulitsa 14, and Vladimir Ilich Kochkarev, stantsia stroitelei Severnoi zh. d. ulitsa Shosseinaya 13, kv. 39, both of Moskovskaya oblast, U.S.S.R.

No Drawing. Filed Mar. 15, 1966, Ser. No. 534,422
Int. Cl. C22c *9/00*
U.S. Cl. 75—134 2 Claims

ABSTRACT OF THE DISCLOSURE

A thermoelectric semiconductor constituted of an alloy of copper, antimony, tellurium and bismuth in which the antimony and bismuth constitute about 30% of the total weight of the alloy. The empirical formula of the alloy is $CuSb_{0.8}Bi_{0.2}Te_2$.

This invention relates to a semiconducting material, and more particularly to a semiconducting material for use in the positive branch of a thermoelement.

A known semiconducting material consists of an alloy of the metals: copper, antimony, and tellurium and has the empirical formula $CuSbTe_2$.

This material has a low thermoelectric effectiveness.

An object of the present invention is to provide an improved semiconductor not having the above-mentioned disadvantage.

A further and more specific object of the present invention is to provide a semiconducting material with a high thermoelectric effectiveness.

According to the invention, these objects are accomplished by including bismuth in the metal alloy semiconducting material in addition to copper, antimony, and tellurium. Furthermore, the antimony and bismuth content should preferably amount to about 30% of the total.

The preferred composition in percent by weight of the semiconducting material of the present invention is as follows:

| | |
|---|---|
| Copper | 13.9 |
| Antimony | 21.27 |
| Bismuth | 9.12 |
| Tellurium | 55.71 |

The preparation of a semiconducting material of the empiricial formula $CuSb_{0.8}Bi_{0.2}Te_2$ used in the positive branch of thermoelements is carried out as follows.

The starting materials (in weight percent):

| | |
|---|---|
| Copper (electrolytic) | 13.9 |
| Antimony (Cy-000) | 21.27 |
| Tellurium (sublimed) | 55.71 |
| Bismuth (chemically pure) | 9.12 |

are charged to a quartz ampoule.

The ampoule is evacuated to a pressure of $10^{-3}$ mm. Hg, sealed and then placed in a furnace. The alloying procedure is carried out at a temperature of 1200° C. The temperature in the furnace is raised at the rate of 200° C. per hour.

The ampoule is kept at a temperature of 1200° C. for a period of 4 hours with continual vibration. The vibration is brought about by an electromagnetic vibrator. At the end of the alloying process, the ampoule is broken and the ingot is ground in a porcelain mortar to a particle size of less than 0.25 mm.

This powder is pressed into a briquette of 30 x 10 x 10 mm. in a heated dismountable mold. Molding is carried out at a temperature of 200° C. and a pressure of 7 tons/cm.$^2$ for a period of five minutes. The briquettes obtained are annealed under vacuum for a period of 40 hours at a temperature of 200° C.

The material prepared in accordance with the above described method has the following thermoelectric properties:

At room temperature (300° K.)

Thermoelectromotive force ($\alpha$)—70 microvolts/deg.
Electrical conductivity ($\sigma$)—4200 ohm$^{-1}$.cm.$^{-1}$.
Thermal conductivity ($\chi$)—$16.72\times10^{-3}$ watts/cm.deg.
Effectiveness ($z$)—$1.23\times10^{-3}$/deg.

In the temperature range of 400 to 500° K.

$\alpha=120\text{–}150$ microvolts/deg.
$\sigma=1500\text{–}2000$ ohm$^{-1}$.cm$^{-1}$
$\chi=16.70\times10^{-3}$ watts/cm.deg.
$z=1.8\pm0.2\times10^{-3}$/deg.

The alloy has a hole conductivity.

What we claim is:

1. A semiconducting material consisting of an alloy of copper, antimony, tellurium and bismuth having the empirical formula $CuSb_{0.8}Bi_{0.2}Te_2$.

2. A semiconducting material consisting of an alloy of metals in weight percent:

| | |
|---|---|
| Copper | 13.9 |
| Antimony | 21.27 |
| Tellurium | 55.71 |
| Bismuth | 9.12 |

References Cited

UNITED STATES PATENTS

| | | | |
|---|---|---|---|
| 2,951,105 | 8/1960 | Busanovich | 75—134 |
| 2,953,616 | 9/1960 | Pessel et al. | 75—134 |

RICHARD O. DEAN, Primary Examiner

U.S. Cl. X.R.

136—238; 252—512, 62.3